United States Patent Office 3,429,848
Patented Feb. 25, 1969

3,429,848
FOUNDRY BINDER COMPOSITION COMPRISING BENZYLIC ETHER RESIN, POLYISOCYANATE, AND TERTIARY AMINE
Janis Robins, St. Paul, Minn., assignor to Ashland Oil & Refining Company, Ashland, Ky., a corporation of Kentucky
No Drawing. Filed Aug. 1, 1966, Ser. No. 569,106
U.S. Cl. 260—38                                    21 Claims
Int. Cl. C08g 37/18, 51/78; B22c 1/22

ABSTRACT OF THE DISCLOSURE

Foundry binder compositions employing novolac or benzylic ether type of phenolic resins in combination with polyisocyanates are cured by the use of a curing agent comprising a tertiary amine or a metal ion used in combination with a silane.

---

The present invention relates to foundry products and foundry processes. In another aspect, the present invention relates to binder compositions useful for making cores which harden at room temperature. In still another aspect, the present invention relates to combinations of a foundry aggregate, such as sand, and a binder based on phenolic resins and polyisocyanates which, on being formed into a coherent mass with the aggregate, is capable of being cured at room temperature, preferably by the use of a gaseous curing agent.

In the foundry art, cores for use in making metal castings are normally prepared from mixtures of an aggregate material, such as sand, which has been combined with a binding amount of a polymerizable or curable binder. Frequently, minor amounts of other materials are also included in these mixtures, e.g. iron oxide, ground flax fibers, and the like. The binder permits such a foundry mix to be molded or shaped into the desired form and thereafter cured to form a self-supporting structure.

Typically, sand is used as the aggregate material. After the sand and binder have been mixed, the resulting foundry sand mix is rammed, blown, or otherwise introduced into a pattern, thereby assuming the shape defined by the adjacent surfaces of the pattern. Then by use of catalysts, e.g. chlorine and carbon dioxide, and/or the use of heat, the polymerizable binder is caused to polymerize, thereby converting the formed, uncured foundry sand mix into a hard, solid, cured state. This hardening can be accomplished in the original pattern, in a gassing chamber, or in the holding pattern. See U.S. Patents 3,145,438 and 3,121,368, which patents are illustrative of the prior art techniques.

Phenolic resins constitute one of the well-known classes of curable resin compositions used as binders in the foundry art. Both the novolac type of phenol-aldehyde resin and the "resole" or "A-stage" resins have been used in this type of application. Novolac resins are soluble, fusible resins in which the polymer chains have phenolic endgroups. They are traditionally prepared by condensing phenols with aldehydes using acid catalysts and employing a molar excess of phenol over aldehyde. Novolac resins can be cured to insoluble, infusible products by the addition of a source of formaldehyde such as hexamethylenetetramine or paraform. Resole and resitole resins, the latter being the more highly polymerized form of a resole resin, are generally prepared using an alkaline catalyst with excess aldehyde and result in polymers having a highly branched structure and therefore a high concentration of alkylol endgroups. Since each alkylol group constitutes a potential cross-linking site, the resole and resitole resins are readily converted to the cross-linked, infusible polymer by heating. The most commonly used monomers are phenol, i.e. hydroxybenzene, and formaldehyde for both the resole type and the novolac type of resin. Although both the novolac resins and the resole resins have advantages and disadvantages characteristic of their different polymer structure in their application as foundry binders, both are subject to the deficiency of requiring heat in order to achieve the cured foundry form. Frequently, it is necessary to keep the green cores in the original molds or patterns during this heating period since many heat-curable binders do not impart sufficient green strength to cause green cores to retain their desired shapes without external support until such time as a final cure can be effected.

In an effort to prepare cores without the necessity of using heat, various prior attempts have been made to prepare binders which would be capable of curing at room temperature, i.e. at temperatures from about 45–120° F., more usually about 60–90° F. A variety of materials have been developed or suggested for use as binders, but these prior art compositions have suffered from one or more deficiencies. Typical of the deficiencies exhibited by prior art binders alleged to cure at room temperature have been a lack of ability to rapidly impart green strength or stripping strength to cores, a lack of tensile strength, intolerably short bench life of foundry mixes, high toxicity, inability to combine well with all foundry aggregates, high sensitivity to moisture, contamination of the surface of castings, and the creation of pinholes in castings. Although some of the heretofore developed binders capable of curing cores at room temperature, rapidly develop sufficient green strength to allow the removal of the core from the pattern, an additional period of up to 24 hours is frequently required in order to cause the cores to become cured and sufficiently strong to be used in the metal casting process.

It is, therefore, an object of the present invention to provide foundry binder compositions which are characterized by their ability to rapidly cure at room temperatures when used in foundry mixes and which, in addition, exhibit one or more of the following properties:

(a) moisture resistance,
(b) high tensile strength,
(c) adhesion to any aggregate commonly used in the foundry art,
(d) the ability to impart an excellent level of moldability or plasticity to foundry sand mixes containing the novel binder composition,
(e) a realistic bench life which generally is independent of the curing rate, and
(f) the ability to form cores which result in excellent castings by reducing or eliminating the general problems of conventional air-drying binders, surface cracks, and surface contamination.

It is another object of this invention to provide foundry mixes based on the novel binder compositions of the present invention.

It is a further object of the present invention to provide a process for producing cores and other foundry shapes from foundry mixes incorporating the novel binder compositions of the present invention.

Still another object of the present invention is to provide foundry products containing the binder compositions of the present invention in cured form.

Other objects will become apparent from the following description and claims.

Broadly described, the binder composition of the present invention are phenolic resins dissolved in non-aqueous systems which have been combined with sufficient polyisocyanate to cross-link the phenolic resins and which contain a metal ion or are cured with tertiary amine. If extremely rapid curing is desired, metal ions are employed in combination with tertiary amine curing.

Although it has been known heretofore that isocyanates react with phenolic resins to result in cross-linked materials, heating has generally been employed to cause the isocyanate to react with the phenolic resin either through the phenolic hydroxyl group or through the methylol group in order to achieve the formation of cross-linking urethane bonds. According to the present invention, two methods for curing phenolic resins with polyisocyanates have ben developed which are particularly effective when employed in combination with each other.

One aspect of the present invention is based on the fact that metal ions dissolved in the phenolic resin phase catalyze its reaction with a polyisocyanate at room temperature if such metal ions exist in a substantially water-free environment. It appears that the metal, in order to function as the catalyst, must not only exist in the ionic state in the same phase as the phenolic resin, but furthermore that the metal ion, in order to function as the catalyst, must exist in an uncomplexed state. Since water is a strong complexing agent, and frequently found in phenolic resin compositions as a result of the methods by which the phenolic resins are produced, the substantial absence of water is emphasized as distinguishing suitable phenolic resins from those unsuitable in the formation of the binders of the present invention. Water constitutes a catalyst poison which, when present in small concentrations, will reduce the catalytic activity of the metal ion but which, if present in larger concentrations, can destroy the activity of the metal ion in accelerating the cross-linking reaction. Increasing metal ion concentrations will proportionately increase the rate of cross-linking of the isocyanate with the phenolic resin. Thus, by adjusting the metal concentration, the phenolic resin can be cured within a few minutes to within several days at normal or slightly elevated temperatures. Since the metal ion is generally incorporated into the phenolic resin prior to admixture with the polyisocyanate, it will be apparent that a slow rate of cross-linking is desirable at the early state of the binder composition in order to permit its mixing with the foundry aggregate, but that once the core has been formed an extremely rapid curing rate is desirable. The rapid curing, which can be controlled in the compositions of the present invention to be less than one minute, is accomplished by contacting the formed foundry mix with a gaseous tertiary amine. In a second aspect, the present invention is based on the fact that tertiary amines by themselves are capable of curing combinations of the described phenolic resin composition and polyisocyanates.

Phenolic resins have, as indicated above, been widely used as foundry binders. Regardless of whether a resole type of resin or a novolac type of resin is employed, the curing of such resins requires heating. The novolac resins require, in addition, a curing agent, preferably in the form of a formaldehyde source such as hexamethylenetetramine. Considerable heating is required to cause the novolac resins to become cross-linked. The resole resins, on the other hand, although capable of rapid curing at elevated temperatures, are less suitable as binder compositions since they normally contain large quantities of water which can cause the formation of steam blisters, are thermally unstable and have a branched structure which causes them to be relatively insoluble and difficult to apply as a uniform coating on a sand particle. Such uniform coating is necessary in order to obtain even bonding of the aggregate and the formation of cores of acceptable tensile strength.

The use of ployisocyanates alone as a core binder does not result in cores which have sufficient tensile strength to make such cores useful for most industrial applications. Additionally, as the amount of polyisocyannate present in the foundry mix is increased, toxicity is generally believed to increase. Further, as the amount of polyisocyanate in a foundry mix is increased, there is an increasing tendency for castings to contain pinholes. It is generally believed that this pinholing is associated with the amount of nitrogen present in the binder. In the compositions of the present invention, however, the quality of polyisocyanate is such as to avoid toxicity problems and pinholing problems.

The binder compositions of the present invention are gnerally made available as a two-package system comprising the resin component in one package and the hardener component in the other package, said resin component comprising an organic solvent solution of a non-aqueous phenolic resin which can also contain a metal ion in catalytic concentration, the said hardener component comprising a liquid polyisocyanate having at least two isocyanate groups per molecule. At the time of use, the contents of the two packages are combined and then mixed with the sand aggregate. After a uniform distribution of the binder on the sand particles has been obtained, the resulting foundry mix is molded into the desired shape. If a slow cure is desired and the phenolic resin contains a metal ion no further action need be taken, since curing will occur at room temperature in the presence of the metal ion. If, however, a rapid cure such as less than a minute is desired, the molded structure is treated with a tertiary amine. Since only very small amounts, i.e. catalytic concentrations, of the amine are necessary to accomplish rapid curing, one can, for example, volatilize small quantities of the tertiary amine into an inert gas stream such as nitrogen or air and pass such a stream through the molded shapes. Any gas which does not itself enter into the reaction is considered an "inert gas" for the purposes of the present invention. In view of the porous nature of the shaped foundry mix, relatively low gas pressures are necessary to achieve the penetration of the molded shape by the gas. In addition, the gas aids in the removal of solvent employed in the phenolic and polyisocyanate components of the two-package binder composition.

As indicated hereinabove, any phenolic resin free of water which is soluble in an organic solvent can be employed. The term "phenolic resin" as employed herein is meant to define any polymeric condensation product obtained by the reaction of a phenol with an aldehyde. The phenols employed in the formation of the phenolic resin are generally all phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms. Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4- methoxy phenol, and p-phenoxy phenol. Such phenols can be described by the general formula:

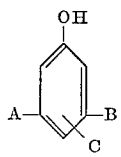

wherein A, B, and C are hydrogen, hydrocarbon radicals, oxyhydrocarbon radicals, or halogen. The preferred phenols are those which are unsubstituted in the para-position as well as in the ortho-positions. The most preferred phenol is the unsubstituted phenol, i.e. hydroxybenzene.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

Then phenolic resins employed in the binder compositions can be either resole or A-stage resins or novolac resins. The resitole or B-stage resins, which are a more highly polymerized form of resole resins, are generally unsuitable. The phenolic resin employed must be a liquid or be organic solvent-soluble. Solubility in organic solvents is desirable to achieve a uniform distribution of the binder on the aggregate. The substantial absence of water in the phenolic resin is desirable to prevent the poisoning of metal ion catalysts, where such are used. The term "non-aqueous" as employed herein is meant to define a phenolic resin which contains less than 5% of water and preferably less than 1% of water based on the weight of the resin.

Although both the resole resins and the novolac resins can be employed in the binder compositions of the present invention and, when admixed with polyisocyanates and a foundry aggregate and cured by use of metal ions and/or tertiary amines form cores of sufficient strength and other properties to be suitable in industrial applications, the novolac resins are preferred over the resole resins. Many resole resins are difficultly soluble in voatile organic solvents and thus do not permit a uniform coating of the aggregate particles. Furthermore, resole resins are generally prepared in aqueous media and even on dehydration contain 10 or more percent of water. Novolac resins generally have a more linear structure and thus are more readily soluble in organic solvents. Because of their higher molecular weight and absence of methylol groups, novolac resins can, furthermore, be more completely dehydrated. The preferred novolac resins are those in which the phenol is prevailingly polymerized through the two ortho positions. The preparation of novolac resins is known in the art and for that reason not specifically referred to herein.

Particularly preferred phenolic resins are condensation products of a phenol having the general formula:

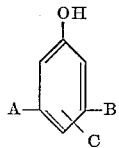

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in copending application Ser. No. 536,180 (ADM– 414). In the preferred form, these resins have the general formula:

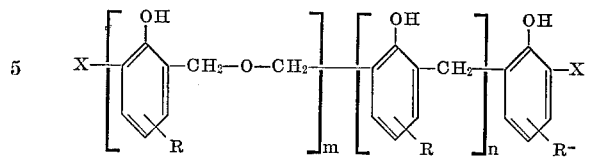

wherein R is a hydrogen or a phenolic substituent meta to the phenolic hydroxyl group, the sum of $m$ and $n$ is at least 2 and the ratio of $m$ to $n$ is at least 1, and X is an end-group from the group consisting of hydrogen and methylol, the molar ratio of said methylol-to-hydrogen end-groups being at least 1.

The phenolic resin component of the binder composition is, as indicated above, generally employed as a solution in an organic solvent and preferably a volatile organic solvent. Suitable solvents include ethers and esters, ordinary mineral spirits, kerosene, and the like. The amount of solvent used is kept as low as possible but should be sufficient to result in a binder composition having a viscosity low enough to permit uniform coating of the binder composition on the aggregate. The specific solvent concentrations for the phenolic resins will vary depending on the type of phenolic resins employed and its molecular weight. In general, the solvent concentration will be in the range of 30 to 80% by weight of the resin solution. It is preferred to keep the viscosity of the first component at less than X–1 on the Gardner-Holdt Scale.

The metal ion catalyst is generally added to the first component in the form of a metal salt. By the term "salt" is meant a compound in which the metal is ionically bonded to the salt radical. It is believed that the catalytic action of the metal salt resides in the metal ion. The principal function of the salt radical is to dissolve the metal ion in the organic medium in which the phenolic resin is dissolved. Hence, the salt radical is selected such that the metal salt is soluble, which is defined for purposes of the present invention as being soluble in catalytic concentrations in the phenolic resin component at room temperature. In order to preserve the ionic nature of the salt, it is preferable that the anion of the salt is derived from an acid having a dissociation constant of greater than $1 \times 10^{-3}$. Preferred salt radicals are carboxylates of hydrocarbon acids. Other salt radicals include perchlorates and sulfonates.

The metal ion employed as the catalyst can be a monovalent, divalent, or trivalent metal ion, or even one having a higher valence state. The preferred metal ions include lead, calcium, zinc, tin, manganese, copper, and magnesium. The efficiency of the metal catalyst will vary somewhat with each metal ion, some being more effective in catalyzing the reaction of the phenolic hydroxyl group with the polyisocyanate, while others are more effective in catalyzing the reaction of the methylolgroup with the polyisocyanate, and a third group being capable of catalyzing both reactions equally well. Examples of suitable catalysts are lead neodecanoate, zinc neodecanoate, lead naphthenate, zinc naphthenate, calcium naphthenate, stannous octoate, zinc lactate, and dibutyl tin dilaurate. The particular activity of a metal ion can be established by reacting an isocyanate with saligenin and determining the extent of the reaction at either the methylol group or at the phenolic hydroxyl group by titration of infra red.

In view of the varying catalytic activity and varying catalytic effect desired, catalyst concentrations will vary widely. In general, the catalyst concentration is selected such that the curing time of the binder composition without the addition of the tertiary amine is from 24 to 72 hours. This is readily established for each particular metal salt and phenolic resin and, generally, falls in the range of 0.001 to 2% by weight of the phenolic resin. It is to be recognized, however, that faster curing rates can be achieved by increasing the concentration of the metal ion to the point that substantially immediate cross-linking and curing occurs when the two components are admixed with each other. However, for the purpose of a core binder, this is not desirable because of the short bench life, i.e. the time in which the aggregate is formable and moldable, required for foundry mixes. As indicated above, the rapid cure of binder compositions having a shelf life of 24 to 72 hours is accomplished by gassing with tertiary amine. The preferred benzylic ether phenolic resins employed in the binder compositions of the present invention contain the metal ion in the dissolved state in concentrations falling within the operative range disclosed, since such metal ions employed in the preparation of the benzylic ether phenolic resins are retained by the resin in dissolved form. It is, therefore, not necessary to add the metal ion to the resin solution when employing the benzylic ether phenolic resins.

The second component or package of the novel binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanates with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivative thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 100 to 300 weight percent of polyisocyanate on the same basis is employed. The polyisocyanate is employed in liquid form. Solid or viscous polyisocyanates are employed in the form of organic solvent solutions. It will be clear that the organic solvent employed should be miscible with the solvent employed for the phenolic resin. Preferred solvents are hydrocarbon solvents and particularly aromatic hydrocarbon solvents such as xylene or toluene. The solvent concentration is preferably less than 50% by weight of the second component.

On combining the two packages of the binder composition of the present invention, the binder is then admixed with sand or a similar foundry aggregate to form the foundry mix. Methods of distributing the binder on the aggregate particles are well-known to those skilled in the art. The foundry mix can, optionally, contain other ingredients such as iron oxide, ground flax fibers, wood cereals, pitch, refractory flours, and the like.

A particularly valuable additive to the binder compositions of the present invention is a silane having the general formula:

wherein R' is a hydrocarbon radical and preferably an alkyl radical of 1 to 6 carbon atoms and R is an alkyl radical, an alkoxy substituted alkyl radical or a alkylamino-substituted alkyl radical in which the alkyl groups have from 1 to 6 carbon atoms. The aforesaid silane when employed in concentrations of 0.1 to 2% based on the phenolic binder and hardener improves the adhesion of the phenolic binder to the foundry aggregate particle.

The aggregate, e.g. sand, is usually the major constituent and the binder portion constitutes a relatively minor amount, generally less than 10%, frequently within the range of 0.25 to about 5%, these figures being based on the weight of the aggregate. Although the sand employed is preferably dry sand, moisture of up to about 1 weight percent based on the weight of the sand can be tolerated. This is particularly true if the solvent employed is non-water-miscible or if an excess of the polyisocyanate necessary for curing is employed, since such polyisocyanate will react with the water, thereby reducing the poisoning effect of the water on the metal ion.

The resulting foundry mix is then molded into the desired core or shape, whereupon it can be cured rapidly by contacting with the tertiary amine. The actual curing step can be accomplished by suspending a tertiary amine in an inert gas stream and passing the gas stream containing the tertiary amine, under sufficient pressure to penetrate the molded shape, through the mold until the resin has been cured. Optimum curing times are readily established experimentally. Since only catalytic concentrations of the tertiary amine are necessary to cause curing, a very dilute stream is generally sufficient to accomplish the curing. However, excess concentrations of the tertiary amine beyond that necessary to cause curing are not deleterious to the resulting cured product. Inert gas streams, e.g. air or nitrogen, containing from 0.1 to 5% by volume of tertiary amine can be employed. Normally gaseous tertiary amines can be passed through the mold as such or in dilute form. The preferred tertiary amines are gaseous tertiary amines such as trimethyl amine, and the like. However, normally liquid amines such as triethylamine are equally suitable if suspended in a gaseous medium and then passed through the mold. Although ammonia, primary amines and secondary amines exhibit some activity in causing room temperature reactions, the resulting cores are considerably inferior.

The binder compositions of the present invention have been principally defined and illustrated in terms of their use in the foundry art. Although the binder compositions are particularly suited for this application, it will be apparent that the binders can also be employed in such applications as adhesives and coatings. In these applications, the rapid cure by treatment with tertiary amine, characteristic of the use of the binder compositions of the present invention in the foundry art, may not be necessary since sufficiently rapid cure can be achieved by use of the metal ion catalyst itself. However, even in such applications, an amine cure is not excluded. Thus, coatings of the binder compositions can be treated with solutions of the tertiary amine.

The present invention is further illustrated by the following examples, in which, unless otherwise indicated, all parts are by weight and all percentages are weight percentages.

EXAMPLES 1 TO 40

Foundry sand mixes were prepared by admixing 20 parts of the phenolic resins further identified below, 20 parts of butyl acetate and the below indicated amount of a mixture of di- and triphenylmethane, di- and triisocyanate commercially available as "Mondur MR" until uniform and thereafter admixing the resulting binder with 2,000 parts of silica sand until the binder was evenly distributed on the sand particles.

The resulting foundry sand mixes were then formed into standard AFS tensile test samples using the standard procedure. The resulting test samples were then cured either by treatment with triethylamine or by storage for 20 hours at 125° F. In treating the samples with triethylamine an air stream was bubbled through the liquid triethylamine and then passed through the test samples for a period of 60 seconds.

The cured samples were then stored in either a dry atmosphere or in an atmosphere of 100% relative humidity for a period of 2 hours before the tensile strength was measured.

The following phenolic resins were employed.

Resin A.—This resin was obtained by charging to a reflux system 720 g. of paraformaldehyde, 1014 g. of phenol, 15 g. of zinc naphthenate solution (8%) and 120 ml. of benzene. The system was heated to reflux (103° C. to 126° C.). After three hours during which water and benzene were distilled off, 150 ml. of diethylene glycol dimethyl ether and 10 ml. of benzene were added. An additional 150 ml. of the ether were added after one further hour of refluxing. After five hours, 600 ml. of tetrahydrofuran were added to dilute the resin system. A total of 310 g. of water was distilled over. The resin and the solvent weighed 2520 g. and was found to be a benzylic ether type of phenolic resin.

Resin B.—The procedure employed for Resin A was repeated except that 15 g. of lead naphthenate solution (24%) instead of the zinc naphthenate solution was employed. The reflux was continued for six hours at a temperature of 105° C. to 125° C. without the addition of the ether. A total of 298 ml. of water was distilled over. To the resin was added 100 ml. of benzene during the reflux and 575 ml. of isopropanol at the end of the reflux. This resin was found to be a benzylic ether type of phenolic resin having a lower molecular weight than Resin A.

Resin C.—This resin was obtained by charging 292 g. of phenol, 63 g. of paraform, 2 g. of zinc naphthenate and 100 g. of toluene. The reaction mixture was refluxed at 258° F. to 266° F. for a period of 6.5 hours and then heated to 380° F. The resulting resin was an o-o-phenol formaldehyde resin of the novolac type.

Resin D.—A commercially available (Synco 2898C) acid-catalyzed phenol formaldehyde, novolac type resin.

Resin E.—A commercially available (Synco 640) oil reactive novolac type resin obtained for p-t-butylphenol and formaldehyde.

The results are illustrated in the following Table I.

TABLE I

| Ex. | Resin | Isocyanate content in parts | Cure | Exposure | Tensile strength in p.s.i. |
|---|---|---|---|---|---|
| 1 | A | 20 | TEA | Dry | 320 |
| 2 | A | 20 | TEA | 100% R.H. | 30 |
| 3 | A | 20 | Storage | Dry | 175 |
| 4 | A | 20 | do | 100% R.H. | 115 |
| 5 | A | 10 | TEA | Dry | 220 |
| 6 | A | 10 | TEA | 100% R.H. | 30 |
| 7 | A | 10 | Storage | Dry | 235 |
| 8 | A | 10 | do | 100% R.H. | 90 |
| 9 | B | 20 | TEA | Dry | 340 |
| 10 | B | 20 | TEA | 100% R.H. | 20 |
| 11 | B | 20 | Storage | Dry | 185 |
| 12 | B | 20 | do | 100% R.H. | 170 |
| 13 | B | 10 | TEA | Dry | 220 |
| 14 | B | 10 | TEA | 100% R.H. | 20 |
| 15 | B | 10 | Storage | Dry | 175 |
| 16 | B | 10 | do | 100% R.H. | 150 |
| 17 | C | 70 | TEA | Dry | 290 |
| 18 | C | 20 | TEA | 100% R.H. | 10 |
| 19 | C | 20 | Storage | Dry | 170 |
| 20 | C | 20 | do | 100% R.H. | 125 |
| 21 | C | 10 | TEA | Dry | 70 |
| 22 | C | 10 | TEA | 100% R.H. | 45 |
| 23 | C | 10 | Storage | Dry | 100 |
| 24 | C | 10 | do | 100% R.H. | 60 |
| 25 | D | 20 | TEA | Dry | 250 |
| 26 | D | 20 | TEA | 100% R.H. | 35 |
| 27 | D | 20 | Storage | Dry | 165 |
| 28 | D | 20 | do | 100% R.H. | 150 |
| 29 | D | 10 | TEA | Dry | 140 |
| 30 | D | 10 | TEA | 100% R.H. | 20 |
| 31 | D | 10 | Storage | Dry | 130 |
| 32 | D | 10 | do | 100% R.H. | 115 |
| 33 | E | 20 | TEA | Dry | 260 |
| 34 | E | 20 | TEA | 100% R.H. | 10 |
| 35 | E | 20 | Storage | Dry | 100 |
| 36 | E | 20 | do | 100% R.H. | 120 |
| 37 | E | 10 | TEA | Dry | 90 |
| 38 | E | 10 | TEA | 100% R.H. | 2 |
| 39 | E | 10 | Storage | Dry | 140 |
| 40 | E | 10 | do | 100% R.H. | 105 |

EXAMPLES 41 TO 58

The procedures of Examples 1 to 40 were repeated except that 1% of a silane having the formula:

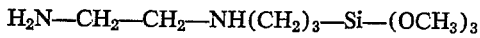

$$H_2N-CH_2-CH_2-NH(CH_2)_3-Si-(OCH_3)_3$$

was added to the binder. The following results were obtained.

TABLE II

| Ex. | Resin | Isocyanate content in parts | Cure | Exposure | Tensile strength in p.s.i. |
|---|---|---|---|---|---|
| 41 | B | 20 | TEA | Dry | 520 |
| 42 | B | 20 | TEA | 100% R.H. | 430 |
| 43 | B | 20 | Storage | Dry | 360 |
| 44 | B | 20 | do | 100% R.H. | 380 |
| 45 | B | 10 | TEA | Dry | 320 |
| 46 | B | 10 | TEA | 100% R.H. | 240 |
| 47 | B | 10 | Storage | Dry | 440 |
| 48 | B | 10 | do | 100% R.H. | 340 |
| 49 | B | 5 | TEA | Dry | 220 |
| 50 | B | 5 | TEA | 100% R.H. | 300 |
| 51 | B | 5 | Storage | Dry | 450 |
| 52 | D | 10 | TEA | Dry | 320 |
| 53 | D | 10 | TEA | 100% R.H. | 230 |
| 54 | D | 10 | Storage | Dry | 450 |
| 55 | D | 10 | do | 100% R.H. | 230 |
| 56 | D | 5 | TEA | Dry | 190 |
| 57 | D | 5 | TEA | 100% R.H. | 180 |
| 58 | D | 5 | Storage | Dry | 470 |

EXAMPLE 59

The procedure of Examples 1 to 40 was repeated using Resin B, 20 parts of the polyisocyanate, triethyl amine and a gas cure time of 90 seconds. Tensile strength of the test bar was 390 p.s.i. In a modification of this procedure the test bar was cured by bubbling air through diethyl amine. The resulting test bar had a tensile strength of 20 p.s.i. In a third modification the tensile bar was cured by blowing NH₃ through the bar. The resulting bar had a tensile strength of 60 p.s.i.

EXAMPLE 60

The procedure of Examples 1 to 40 was repeated employing instead of the "Mondur MR" polyisocyanate, a polymethylene polyphenyl isocyanate commercially available as "Papi." The test bars were cured by treatment with triethyl amine as described. Employing 20 parts of the polyisocyanate, a tensile strength on curing of 320 p.s.i. was obtained. Employing 10 parts of the polyisocyanate, the tensile strength of the gas cured test bar was 250 p.s.i.

What is claimed is:

1. A binder composition comprising in admixture a resin component, a hardener component, a curing agent, and a silane additive in catalytic concentrations, said resin component comprising an organic solution of a non-aqueous phenolic resin; said hardener component comprising liquid polyisocyanate containing at least two isocyanate groups; said polyisocyanate being present in a concentration of 20 to 300% by weight of the resin; said curing agent comprising a metal ion or a tertiary amine and said silane additive having the formula

wherein R' is a hydrocarbon radical and R is an alkyl radical, an alkoxy-substituted alkyl radical or an alkylamino-substituted alkyl radical, said alkyl radical having from 1 to 6 carbon atoms.

2. The binder composition of claim 1 wherein the phenolic resin is a condensation product of a phenol having the general formula:

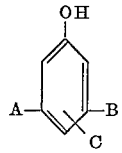

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms.

3. The binder composition of claim 2 wherein the aldehyde is formaldehyde.

4. The binder composition of claim 2 wherein the aldehyde is formaldehyde, and A and B are hydrogen and C is a hydrocarbon radical.

5. The binder composition of claim 2 wherein the aldehyde is formaldehyde and A, B and C are hydrogen.

6. The binder composition of claim 1 wherein the phenolic resin has the general formula:

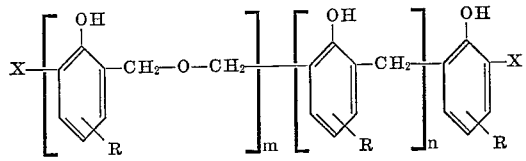

wherein R is hydrogen or a phenolic substituent meta to the hydroxyl group of the phenol, $m$ and $n$ are numbers the sum of which is at least 2, and the ratio of $m$-to-$n$ is at least 1, and X is a hydrogen or a methylol group, the molar ratio of said methylol group-to-hydrogen being at least 1.

7. The binder composition of claim 6 wherein R is hydrogen.

8. The binder composition of claim 6 wherein the polyisocyanate is an aromatic polyisocyanate.

9. The binder composition of claim 8 wherein the aromatic polyisocyanate is diphenylmethane diisocyanate.

10. The binder composition of claim 1 wherein the curing agent is a tertiary amine.

11. The binder composition of claim 1 wherein the metal of the metal ion is a divalent metal.

12. The binder composition of claim 1 wherein the metal ion is in the form of a metal salt, the acid of said salt radical being a carboxylic acid having a dissociation constant above $1 \times 10^{-8}$.

13. A foundry mix containing sand as the major constituent and a binding amount of up to 10% based on the weight of sand of the binder of claim 1.

14. A foundry mix containing sand as the major constituent and a binding amount of up to 10% based on the weight of sand of the binder of claim 6.

15. The process of preparing shaped foundry products, comprising:
 (a) mixing the phenolic resin component, hardener component and the silane of claim 1, said polyisocyanate being employed in a concentration of 20 to 300% by weight of the phenolic resin;
 (b) preparing a foundry mix by admixing a foundry aggregate containing sand as the major constituent with a binding amount of up to 10% based on the weight of the aggregate of the composition of step (a);
 (c) shaping the foundry mix in a mold; and
 (d) contacting the shaped foundry mix with a tertiary amine until the binder has cured.

16. The process of claim 15 wherein the tertiary amine is passed through the shaped foundry mix in gaseous form.

17. The process of claim 15 wherein the tertiary amine is gaseous at room temperature.

18. The process of claim 15 wherein the tertiary amine is suspended in an inert gas stream which is passed through the shaped foundry mix.

19. The process of claim 15 wherein the resin component of the binder is the phenolic resin of claim 7.

20. The process of claim 19 wherein the polyisocyanate is an aromatic polyisocyanate.

21. The process of claim 17 wherein the tertiary amine is trimethyl amine or triethyl amine.

References Cited

UNITED STATES PATENTS 2,374,136   4/1945   Rothrock _____ 260—59

MORRIS LIEBMAN, *Primary Examiner.*

R. BARON, *Assistant Examiner.*

U.S. Cl. X.R.

260—52, 59